(12) United States Patent
Delbos

(10) Patent No.: US 9,677,316 B2
(45) Date of Patent: Jun. 13, 2017

(54) MOTORIZED DEVICE FOR OPENING AND/OR CLOSING AN AIRCRAFT DOOR

(71) Applicant: RATIER FIGEAC, Figeac (FR)

(72) Inventor: Eric Delbos, Lacapelle-Marival (FR)

(73) Assignee: RATIER FIGEAC, Figeac (FR)

( * ) Notice: Subject to any disclaimer, the term of this patent is extended or adjusted under 35 U.S.C. 154(b) by 0 days.

(21) Appl. No.: 14/572,140

(22) Filed: Dec. 16, 2014

(65) Prior Publication Data

US 2015/0167373 A1    Jun. 18, 2015

(30) Foreign Application Priority Data

Dec. 16, 2013  (FR) ...................................... 13 62708

(51) Int. Cl.
| E05D 15/58 | (2006.01) |
| E05F 15/611 | (2015.01) |
| E05F 15/63 | (2015.01) |
| B64C 1/14 | (2006.01) |
| F16H 25/20 | (2006.01) |
| F16H 25/24 | (2006.01) |

(52) U.S. Cl.
CPC .......... *E05F 15/611* (2015.01); *B64C 1/1407* (2013.01); *E05F 15/63* (2015.01); *F16H 25/20* (2013.01); *F16H 25/2454* (2013.01); *F16H 2025/2071* (2013.01); *Y10T 74/18576* (2015.01); *Y10T 74/18696* (2015.01); *Y10T 74/18704* (2015.01)

(58) Field of Classification Search
CPC ...... E05F 15/611; E05F 15/63; B64C 1/1407; F16H 25/20; F16H 25/2454; Y10T 74/18704; Y10T 74/18576; Y10T 74/18696

USPC .................................. 49/254, 255, 258, 259
See application file for complete search history.

(56) References Cited

U.S. PATENT DOCUMENTS

| 3,731,546 A | * | 5/1973 | MacDonald ...................... 74/63 |
| 3,791,073 A | * | 2/1974 | Baker .............................. 49/249 |
| 3,820,282 A | * | 6/1974 | Kornylak ......................... 49/255 |
| 4,833,827 A | * | 5/1989 | Bode et al. ..................... 49/280 |
| 4,953,324 A | * | 9/1990 | Herrmann ....................... 49/255 |
| 5,156,359 A | * | 10/1992 | Noble et al. ............... 244/129.4 |
| 5,163,639 A | * | 11/1992 | Herrmann et al. ........ 244/129.5 |
| 5,180,121 A | * | 1/1993 | Banks et al. ............... 244/129.5 |
| 6,742,744 B2 | * | 6/2004 | Schreitmueller et al. . 244/129.5 |
| 7,210,268 B2 | * | 5/2007 | Tong et al. ..................... 49/255 |
| 7,484,331 B2 | * | 2/2009 | El Jalkh ......................... 49/260 |
| 7,578,476 B2 | * | 8/2009 | Wiers et al. ............... 244/129.5 |

(Continued)

FOREIGN PATENT DOCUMENTS

| DE | 197 38 402 | 3/1999 |
| DE | 197 38 404 | 3/1999 |
| WO | WO 2014/075798 A3 | 5/2014 |

OTHER PUBLICATIONS

French Preliminary Search Report, FR 1362708, Jul. 4, 2014.

*Primary Examiner* — Jerry Redman
(74) *Attorney, Agent, or Firm* — Volpe and Koenig, P.C.

(57) ABSTRACT

A device for opening or closing an aircraft door includes an electric motor; a connector to connect the motor, and a driver. The driver includes a screw and nut system having a screw rotationally driven by the motor. The driver is configured to drive continuously and in sequence the connector with the door in a translational movement along one preset direction and then in rotational movement.

11 Claims, 4 Drawing Sheets

(56) References Cited

U.S. PATENT DOCUMENTS

| | | | | |
|---|---|---|---|---|
| 8,484,895 | B2* | 7/2013 | Kuhnmuench | ............... 49/164 |
| 9,199,716 | B2* | 12/2015 | Knijnenburg | |
| 2002/0139897 | A1* | 10/2002 | Erben et al. | ............. 244/129.5 |
| 2015/0167373 | A1* | 6/2015 | Delbos | |
| 2015/0292254 | A1* | 10/2015 | Bessettes et al. | |

* cited by examiner

MOTORIZED DEVICE FOR OPENING AND/OR CLOSING AN AIRCRAFT DOOR

BRIEF SUMMARY OF THE INVENTION

The present invention relates to a motorized device for opening and closing an aircraft door.

An aircraft door, especially a door intended for passengers to go through during boarding and exiting, opens and closes in a particular way. Opening such a door is generally done in three phases: the door is first unlocked. In a second phase, the door is then raised for it to release along a preset trajectory. Finally, the third phase of opening itself is provided during which the door "pivots", or more precisely clears the entrance, by a circular translation movement. Closing the door is done by an inverse procedure of that used for opening thereof.

The document EP-0,465,785 describes a kinematics for an airplane door in which said door pivots outward for opening and returns by pivoting into the fuselage structure for closure and is then brought into a mechanically locked position relative to the fuselage structure. In the door described, the transmission of forces resulting from the interior pressure of the cabin takes place through position stops or levers and the door, during pivoting operation, is held by means of a guide-support with one end near the fuselage and one end near the door. Electric motors are provided for being program controlled for the pivoting, closing and locking actions and also for the inverse functions such that the various functions take place in a coordinated manner because of stored programs.

Several motors are provided here and, although this document from the prior art claims a reduction in mass, the presence of these motors and corresponding mechanisms makes the control system heavy and complex.

In its preamble, the document WO-2012/110,569 summarizes the state of the technical art concerning assisted aircraft door opening systems. It in turn proposed an aircraft or spacecraft door system comprising a door and an actuator intended to actuate the door. The actuator includes an actuator drive mechanism which moves the door relative to the aircraft or spacecraft, a detection device which determines door and/or actuator movement information, an actuator control unit which controls the actuator on the basis of the movement information and also an actuator housing surrounding the actuator drive mechanism and the actuator control unit.

In the embodiment described in this document from the prior art and illustrated in the drawing, manual unlocking and manual locking of the door under consideration is provided. Furthermore, only the opening (and closing) operation strictly speaking is motorized.

The present invention then has the objective of providing a motorized aircraft door opening and/or closing device simplified compared to existing devices and making use specifically of a limited number of motors.

Thus with a device according to the present invention, a displacement along a substantially vertical direction of the door involved and a circular translation movement can be achieved specifically through the use of a single motor. Here it is suitable to provide a relatively quick vertical movement without however having an overly sudden opening of the door.

Advantageously with the device according to the invention, the door can be held in open position, preferably also in any intermediate position.

For this purpose, the present invention proposes a motorized device for opening and/or closing an aircraft door comprising an electric motor.

According to the present invention, the motorized device furthermore comprises:

means for connection with the door, and means for driving comprising a screw/nut system with a screw rotationally driven by the motor where said drive means are suited for driving continuously and in sequence the means for connection with the door in a translational movement along one preset direction and then in rotational movement.

With the solution proposed by the present invention, a double movement of the door can thus be executed with a single motor. Here motor is understood to mean drive means acting on a single shaft. In aeronautics, electrical systems are conventionally redundant. Then for example, two motors will be nested one behind the other or two motors will be nested in a single housing with distinct windings.

In a motorized device according to the invention, the means for connection with the door comprise, for example, a pivoting arm.

In a preferred embodiment, a device according to the invention is a motorized device for opening and/or closing an aircraft door associated with a pivoting arm comprising an electric motor fixed on a support and coupled to a screw so as to be able to rotationally drive the screw, a nut for a screw/nut system engaging with said screw, where the screw drives the pivoting arm in translation. The motorized device furthermore comprises:

a coupling system with a first coupling part rigidly connected to the screw and a second coupling part complementary to the first coupling part and mobile relative thereto between at least one coupled position in which the first coupling part drives the second coupling part and at least one decoupled position in which the two coupling parts are independent of each other, and a reduction gear with an entry part, called entry shaft, rigidly connected to the second coupling part and an output part rotationally driven by the entry shaft with a reduction ratio and called exit ring gear, where the exit ring gear is connected with the pivoting arm so as to be able to rotationally drive it.

The combination here of a coupling (or clutch) system with a reduction gear is particularly advantageous. This way a relatively significant rotation speed can be used for the phases of unlocking and lifting the door (during opening) and a reduced rotation speed can be used for the opening phase itself, which thereby avoids a sudden opening of the door, where everything is done in a time corresponding to the usual time for opening a door, or less.

Furthermore, the proposed kinetics is adjustable and therefore can be adapted to any aircraft door, whatever its size, weight, etc.

To make the maneuver easier and to limit the torque necessary from the motor used, the screw/nut system used in the motorized device according to the invention is advantageously a screw/nut system with rolling elements, for example a screw/nut system with balls or rollers. In this way, the mass of the assembly can especially be reduced.

A claw clutch can for example be provided for the coupling system. Such a clutch is perfectly suited to the present application; it is reliable, has a reduced mass and has an attractive price.

To get attractive reduction ratios, the reduction gear advantageously comprises a planetary gear train. Other types of reduction gears can also be considered here. However preference will be given to systems having a fairly high reduction ratio (greater than 50 considering the ratio of the input speed to output speed). Here a preferred implementation provides for the reduction gear to comprise a first ring with teeth, a second ring whose diameter is different from that of the first and with teeth that have the same size as those of the first ring and concentric therewith and for the reduction gear to furthermore comprise a deformation inducing element that deforms the second ring such that in at least two positions the teeth of both rings are engaged and separated by at least one position where the teeth are not engaged so as to propagate on the perimeter of the second ring a deformation wave causing a relative rotation of the second ring relative to the first. Such a reduction gear corresponds for example to a reduction gear as described in the document FR-1,146,998.

To increase the precision of the device according to the invention, the invention furthermore advantageously comprises a structure fixed relative to the support for the motor and means of guiding between the pivoting arm and the fixed structure. In a preferred embodiment, these means of guiding comprise a groove and a finger whose shape is suited for sliding in said groove. It doesn't matter whether the groove is made on the fixed structure or on the pivoting arm.

To limit the forces in the reduction gear, the device according to the invention can also be arranged to comprise a structure fixed relative to the support of the motor having a groove parallel to the screw of the screw/nut system and also a finger which can slide in said groove and fixed on the exit ring gear. The negative feedback during the pivoting of the arm is thus transmitted to the fixed structure and not to the reduction gear.

In order to be able to implement a locking of the system, the motorized device according to the invention advantageously comprises disengageable means of locking which act, for example, on the screw of the screw/nut system or else on the motor shaft of the electric motor. Acting on the motor shaft at the electric motor then has the advantage of the maximum reduction ratio for implementing the locking. Thus, a preferred embodiment for these locking means provides for them to comprise a first coupling disk rigidly connected to the motor shaft, and a second coupling disk rotationally locked and arranged opposite the first coupling disk, means of elastic pre-stressing acting on the second coupling disk in a manner to allow coupling between the first coupling disk and the second coupling disk, and a coil acting on the second coupling disk against the means of elastic pre-stressing when it is powered with an electric current. In this embodiment, if an electric power outage occurs, the system is locked and is thus safe.

The present invention also relates to an aircraft door characterized in that it comprises a motorized device as described above.

BRIEF DESCRIPTION OF THE DRAWINGS

Details and advantages of the present invention will become clearer from the following description made in reference to the attached schematic drawing in which:

FIG. 1 shows a motorized device intended to open and close an aircraft door, not shown. The person skilled in the art knows such an aircraft door such as described in the preamble of the present document. The door in question here opens and closes by a circular translation movement. An aircraft door closes a passage made in an aircraft fuselage. To clear this passage, the door comes to a position next to the passage made in the fuselage and outside thereof.

DETAILED DESCRIPTION OF THE INVENTION

Opening of such an aircraft door is done in three distinct phases. During a first, or unlocking, phase, the door is unlocked. During a second, or lifting, phase, the door is raised so it comes clear along a well-defined trajectory, usually by means of guiding by rollers. The last, or pivoting, phase corresponds to opening of the door, properly speaking. During this phase, the door undergoes circular translation movement through about 110 to 130°. To achieve this movement, the door is mounted on a pivoting arm. This door is pivotably mounted both around a substantially vertical axis connected to the aircraft fuselage and also around a substantially vertical axis connected to the door. This pivoting arm bearing the door is, for example, combined with a guiding rod so as to define a parallelogram and to thereby guide the door in its opening movement.

Figure 1:
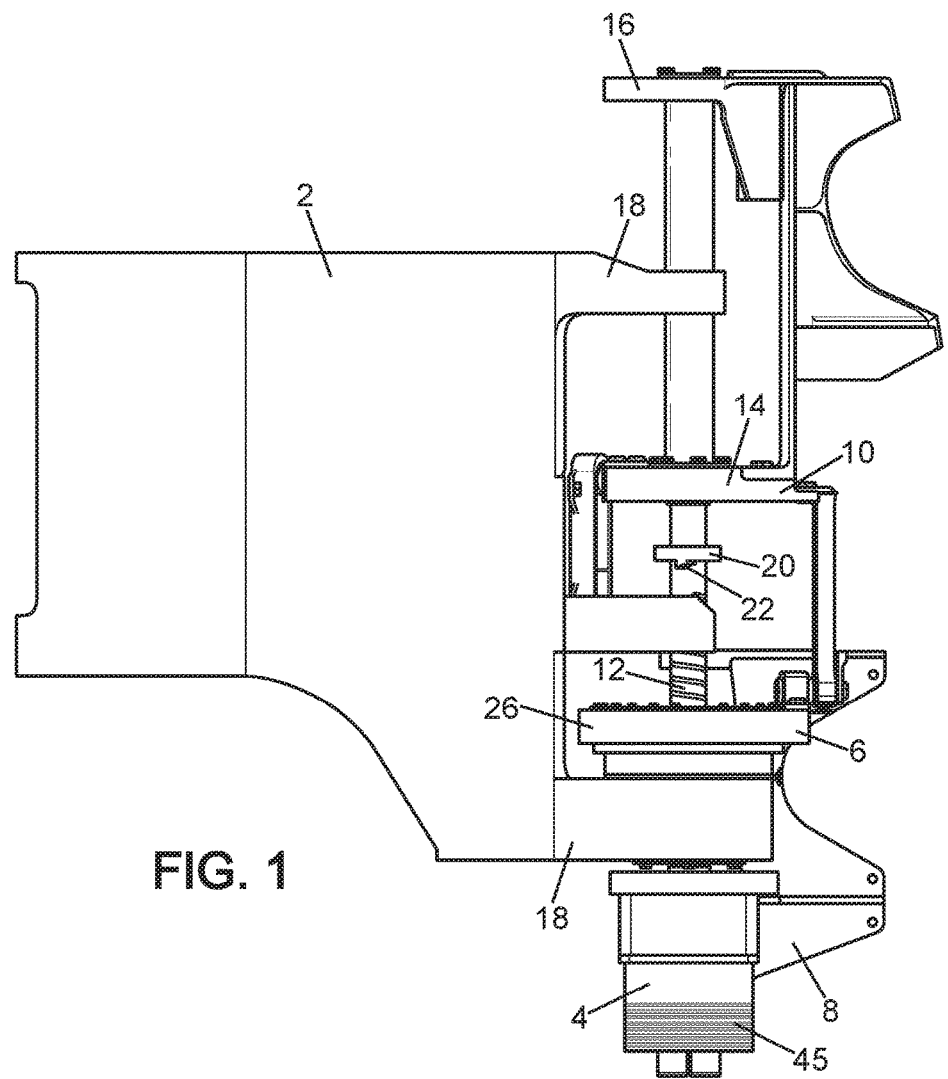
FIG. 1 is an elevation view of an embodiment of a motorized device according to the present invention.

In FIG. 1, a part of a pivoting arm 2 corresponding to a pivoting arm as described above is shown. This pivoting arm 2 is combined with a motorized device described below.

The motorized device comprises first a motor 4, a screw/nut system and a reduction gear 6. The motor 4 is attached on a support 8 rigidly connected to the aircraft fuselage. This support 8 also carries a fixed structure, subsequently called housing 10, serving especially for attaching and holding the motorized device.

The motor 4 can be any known type of electric motor. Preferably it involves a motor with reduction gear including a brush type motor or a brushless motor or a brushless motor with external rotor, etc. Here it will be assumed that it comprises one housing and one traversing motor shaft 5. Both ends of the motor shaft 5 are then accessible. One end of the motor shaft 5 can be combined with a reduction gear thus forming a motor with reduction gear assembly. Conventionally in aeronautics, electrical systems are duplicated for safety. A second motor, not shown, is then also coupled to motor shaft 5. The second motor can come with a separate housing or be integrated into the same housing as motor 4.

The motor 4 drives a screw 12 from the screw/nut system which is directly mounted on the output of the motor with reduction gear. It will subsequently be assumed that the screw 12 extends along a vertical axis and that the motor 4 is positioned lower than the screw 12.

The screw 12 is thus held in lower position by the motor 4 (attached on the support 8 thereof), in intermediate position by an intermediate bearing 14 born by the housing 10 and in upper position by a stop 16 itself also made in the housing 10. The screw 12 here serves as pivoting axis for the pivoting arm 2. This pivoting arm thus has two ears 18 inside of which are arranged in each one a bearing for guiding the pivoting arm 2 relative to the pivoting axis thereof. The lower ear 18 has a housing inside of which is located a nut engaging with the screw 12. This nut is mounted so that it can turn freely around the axis of the screw 12 relative to the pivoting arm 2 but is trapped along the longitudinal direction (relative to the screw 12). The screw is thus, for example, mounted in a housing arranged in the lower ear 18 by means of two ball bearings and between two axial stops.

In FIG. 1, the presence of a first coupling part forming a stop disk 20 can also be seen where the disk has the shape of an annular part fixed on the screw 12 so as to be driven rotationally therewith but keeping a fixed axial position, which could be adjustable, relative to the screw 12. As can be seen, this stop disk has at least one claw 22 extending axially downward. Advantageously at least two claws 22 regularly arranged around the screw 12 are provided. Such a claw 22 is also called "wolf tooth".

Figure 2:
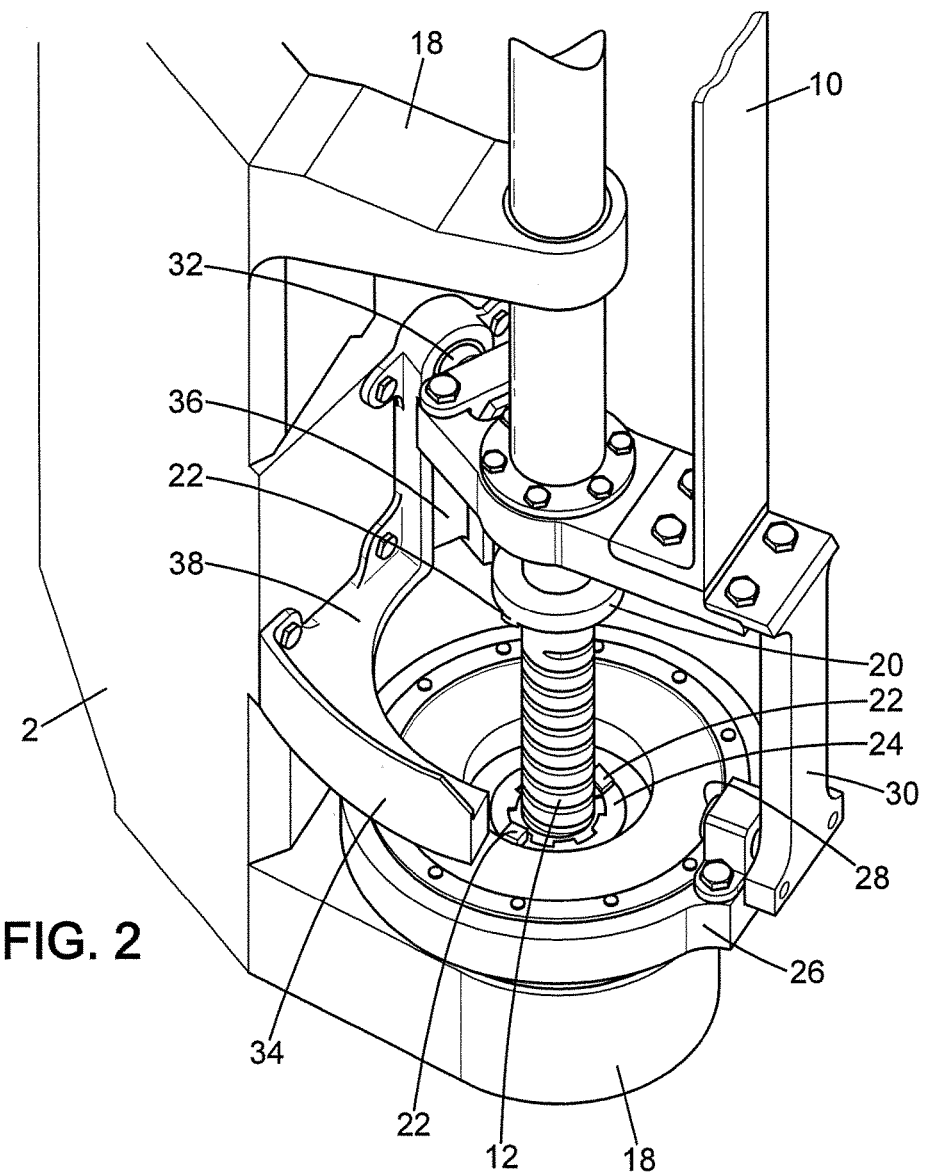
FIG. 2 is a partial perspective view of the motorized device from FIG. 1.

This first coupling part is intended to engage with the second coupling part visible in FIG. 2. The second coupling part is subsequently called the mobile disk 24. This disk has an overall shape similar to that of the stop disk 20, meaning that of a disk with claws 22. Here however, the claws 22 are oriented upward so as to be able to engage with the claws 22 of the stop disk 20. Each claw 22 has a straight edge and a chamfered edge oriented along the direction of rotation of the screw 12 to enable a progressive coupling of the two coupling parts.

The mobile disk 24 is itself arranged around the screw 12 but is not driven thereby. It is intended to be driven in rotation by the stop disk 20 as will be explained below.

The mobile disk 24 is fixed on the reduction gear 6. The reduction gear 6 can be made up of any type of reduction gear that can be adapted here. For reasons of bulk and also transmitted torque, a reduction gear will be chosen here having the shape of an planetary gear train or else with the shape of a reduction gear such as sold under the Harmonic Drive brand (and whose principle of operation is described in the document U.S. Pat. No. 2,929,265 or FR-1,146,998).

Whatever the type of reduction gear 6, it is assumed that it comprises an entry shaft rigidly connected with the mobile disk 24. The entry shaft is for example a hollow shaft mounted around the screw 12 and the mobile disk 24 is attached (by screwing for example) on the upper front surface thereof. The reduction gear 6 has a reduction ratio 1:N and the rotational movement of the entry shaft is transmitted to an output part, here called exit ring gear 26, itself also mounted around the screw 12 and which turns then with a rotation speed N times less than the entry shaft. The exit ring gear 26 is fixed on the lower ear 18 and therefore drives the pivot arm 2 in rotation when it turns To limit the forces on the internal mechanism of the reduction gear 6, a finger 28 is fixed to the periphery of the exit ring gear 26 and extends radially outward. This finger 28 engages in a groove arranged in a constituent branch 30 of the housing 10. The branch 30, just like the groove arranged therein, extends vertically, meaning parallel to the screw 12.

Figure 3:
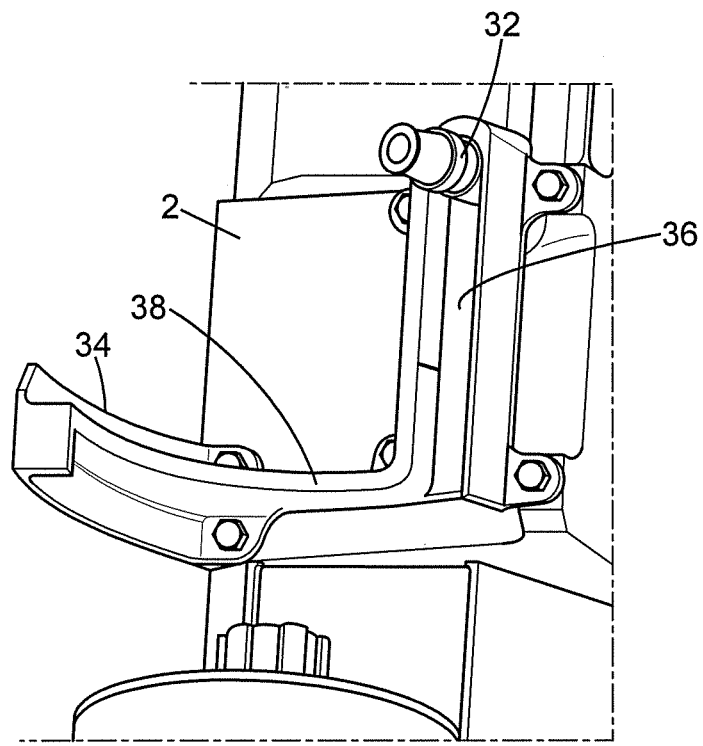
FIG. 3 is a perspective view of a detail at a different viewing angle than that of FIG. 2 and at an enlarged scale showing the means of guiding implemented in the motorized device from FIGS. 1 and 2.
Figure 4:
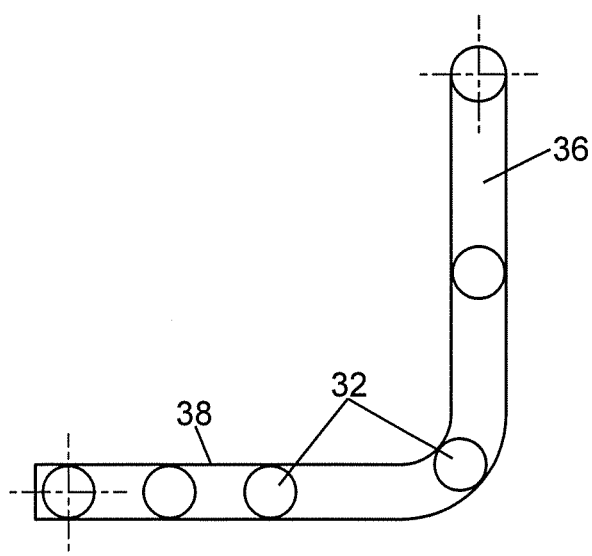
FIG. 4 is an explanatory schematic view corresponding to the means of guiding illustrated in FIG. 3.

A guide is made between the pivoting arm 2 and the housing 10, meaning between the arm and a structure fixed relative to the aircraft fuselage. To implement this guide, as shown in more detail in FIG. 3, a cam 32 is attached on the housing 10 (not shown in FIG. 3) extending towards the pivoting arm 2 whereas a guide 34 is attached on the surface of the pivoting arm 2 opposite the cam 32. In the embodiment shown in the drawing, arranging the cam 32 such that the guide 34 is located between the two ears 18 of the pivoting arm 2 was selected.

The guide 34 has a vertical groove 36 and a horizontal edge 38 with a circular arc shape intended to press against the cam 32.

Figure 5:
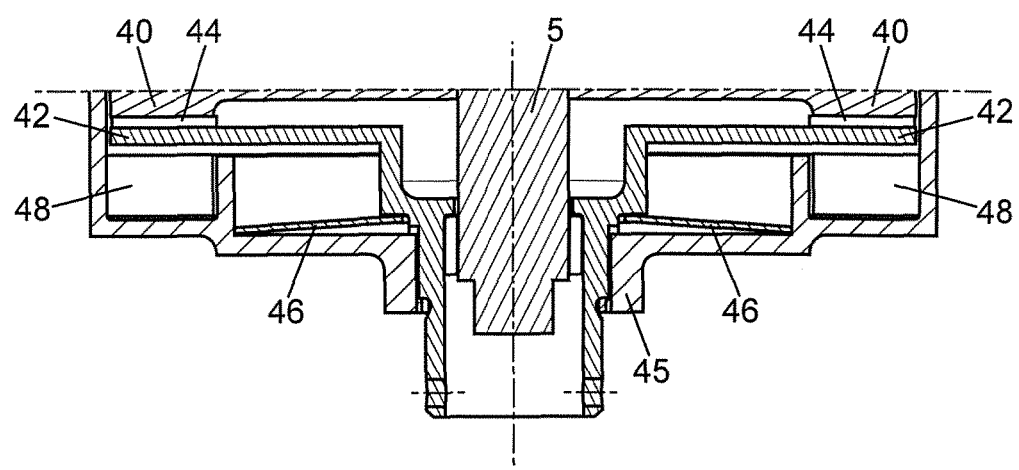
FIG. 5 is a detailed view in longitudinal section of locking means which can be implemented with a motorized device such as illustrated in FIGS. 1 to 3.

FIG. 5 illustrates a locking system which is preferably housed under the motor 4 but which could for example be placed between the motor 4 and the screw 12 or else also be housed in the intermediate bearing 14 or else in the stop 16.

Here it is proposed to rigidly connect a first clutch disk 40 to one end of the motor shaft 5 opposite the screw 12 using a key (not shown). A second clutch disk 42 with suitable dimensions then comes against opposite the first clutch disk 40 and friction plates 44 are provided on one and/or both clutch disks.

The second clutch disk 42 is assembled in a box 45, attached for example to the housing of the electric motor 4, so as to be able to move axially (the motor shaft 5 and the screw 12 here determine the axial direction) relative to said box 45, but without possibility of pivoting around the motor shaft 5. Furthermore, the second clutch disk 42 is prestressed by a spring 46 against the first clutch disk 40, where the spring 46 comes for example to press against an inner surface of the box 45.

A coil 48 is mounted to the periphery of the second clutch disk 42 inside the case 45. When the current (fairly intense) passes through this coil 48, it holds the second clutch disk 42 away from the first clutch disk 40 and against the spring 46.

The operation of this device for aircraft door opening and closing is described below.

The motor 4 (motor with reduction gear) rotationally drives the screw 12 with bearings. So that the motor 4 can operate, the locking system is deactivated by sending current through the coil 48 (FIG. 5).

During rotation thereof, the screw 12 with bearings first drives the nut with bearings located in the lower ear 18. Rotation of the screw 12 drives translational displacement of the nut with bearings. The pivot arm 2 is translationally driven with the nut with bearings by being guided by the guiding system comprising the cam 32 and the guide 34.

The rising of the nut and the pivot arm 2 continues. This rising phase corresponds to the phase of unlocking/lifting the aircraft door. During this phase, the door is itself also guided, for example by means of guiding provided in the area of the doorframe.

At the end of the rising phase, the pivoting arm 2 is brought to pivot in order to allow the opening of the door. At this moment, the cam 32 then leaves the grove 36 of the guide 34. This exit out of the groove 36 also corresponds to the beginning of the coupling between the mobile disk 24 with the stop disk 20. The claws 22 then come to hold on each other. The stop disk 20 and the guide 34 are positioned such that the exit of the cam 32 out of the groove 36 coincides with the coupling of these two disks.

The stop disk 20 is rotationally driven by the screw 12. This rotational movement continues and the stop disk 20 therefore drives therewith the mobile disk 24. This disk is rigidly connected with the entry shaft of the reduction gear 6 which is thereby put into operation. The exit ring gear 26 is then itself also rotationally driven but with a slower rotation speed. As a numeric example, entirely illustrative and in no way limiting, the screw 12 can for example have a rotation speed of order 300 RPM. If a planetary gear train is used, the reduction gear can, for example, have a reduction ratio of 1:50. The result is then a rotation speed of the exit ring gear 26 of about 6 RPM. As indicated above in the preamble, it is appropriate to pivot the pivoting arm 2 through about 110 to 130°. The result is thus that the door is opened in about 2 to 3 seconds after the phase of lifting the door.

The motor 4, or the motor with reduction gear, is advantageously subject to control by position and it is stopped once the door reaches the fully open position thereof. Additionally, the passage of current in the coil 48 is stopped sufficiently that the spring 46 by acting on the second clutch disk 42 comes to rotationally stop the screw 12.

Note that during opening of the door, the pivoting arm 12 is resting on the aircraft structure through the intermediary of the edge 38 which comes to rest on the cam 32. The pivoting arm 2 and thereby the corresponding door are therefore supported during any opening of the door thus blocking any accidental falling back down.

It seems unnecessary here to describe the closing procedure for the door which corresponds to the inverse procedure of the opening procedure.

The motorized device described here thus enables a motorization using a single motor for the phases of locking/unlocking, raising/lowering and translation of an aircraft door during the opening and closing thereof.

The device described can easily be controlled manually for cases especially where the electrical function is not available (e.g. electric supply outage, failure, etc.). Because of the presence of a screw/nut with bearings system, a manual maneuver becomes easier. The manual control could for example be done using a square tip crank that could be used for driving the screw of the screw/nut system.

The device described could also be equipped with various sensors for the control thereof. A position sensor (rotary) can also, for example, be combined with the screw of the screw/nut system—which does not necessarily use bearings—to enable better control of the door opening and closing phases. Many types of sensors can be used here. The following list is proposed as a nonlimiting example: resolver, RVDT (Rotary Variable Differential Transformer) and potentiometer.

The device described has all the capacity necessary in terms of performance (e.g. opening time, etc.) and availability even for meeting requirements for use in emergency opening.

This motorized device, as can be seen from the preceding description, serves to very substantially limit the manual force exerted by the flight crew of an aircraft for opening and closing the door. Here all the opening and closing phases are assisted by a motor.

The solution proposed by the present invention offers the advantage of having simple kinetics for providing all the opening/closing phases.

The mass of the assembly is minimized because the proposed system has good efficiencies and an optimization of the reduction ratios with which to provide motorization with an electric motor having a relatively low torque and therefore reduced mass.

The system can be subject to control by position and/or speed and/or torque of the door. An adaptation can be provided for example according to different opening and/or closing phases.

Of course, the present invention is not limited to the embodiment described above and illustrated in the drawings and to the variants indicated. It also involves any embodiment within reach of the person skilled in the art in connection with the claims here below.

What is claimed is:

1. A device for opening or closing an aircraft door, the device comprising:
    an electric motor,
    means for connection with the door, and
    means for driving comprising a screw and nut system having a screw rotationally driven by the motor where said drive means are suited for driving continuously and in sequence the means for connection with the door in a translational movement along one preset direction and then in rotational movement, wherein the electric motor is fixed on a support and is coupled to a screw so as to be able to rotationally drive the screw, a nut for the screw and nut system engaging with said screw, where the screw drives the pivoting arm in translation, and the drive means additionally comprises: a coupling system with a first coupling part rigidly connected to the screw and a second coupling part complementary to the first coupling part and mobile relative the first coupling part between at least one coupled position in which the first coupling part drives the second coupling part and at least one decoupled position in which the two coupling parts are independent of each other, and a reduction gear with an entry shaft, rigidly connected to the second coupling part and an exit ring gear rotationally driven by the entry shaft with a reduction ratio, where the exit ring gear is connected with the pivoting arm so as to be able to rotationally drive the pivoting arm.

2. A device according to claim 1, wherein the means for connection with the door comprises a pivoting arm.

3. A device according to claim 1, wherein the screw and nut system is a screw and nut system with rolling elements.

4. A device according to claim 1, wherein the coupling system is a claw clutch.

5. A device according to claim 1, comprising a structure fixed relative to the support for the motor and means of guiding between the pivoting arm and the fixed structure.

6. A device according to claim 5, wherein the means of guiding comprises a groove and a finger having a shape adapted to slide in said groove.

7. A device according to claim 1, comprising a structure fixed relative to the support of the motor having a groove parallel to the screw of the screw/nut system and a finger which can slide in said groove and fixed on the exit ring gear.

8. A device according to claim 1, comprising disengageable means of locking.

9. An aircraft door comprising the device according to claim 1.

10. A device for opening or closing an aircraft door, the device comprising:
    an electric motor,
    means for connection with the door,
    disengageable means of locking and
    means for driving comprising a screw and nut system having a screw rotationally driven by the motor where said drive means are suited for driving continuously and in sequence the means for connection with the door in a translational movement along one preset direction and then in rotational movement, wherein the electric motor comprises a motor shaft and wherein the disengageable means of locking acts on said motor shaft.

11. A device according to claim 10, wherein the disengageable means of locking comprises a first coupling disk rigidly connected to the motor shaft, a second coupling disk rotationally locked and arranged opposite the first coupling disk, means of elastic pre-stressing acting on the second coupling disk in a manner to allow coupling between the first coupling disk and the second coupling disk, and a coil acting on the second coupling disk against the means of elastic pre-stressing when the coil is powered with an electric current.

* * * * *